US006305884B1

(12) United States Patent
Lewis et al.

(10) Patent No.: US 6,305,884 B1
(45) Date of Patent: Oct. 23, 2001

(54) ROTARY POWDER FEED THROUGH APPARATUS

(75) Inventors: Gary K. Lewis; Richard M. Less, both of Los Alamos, NM (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 09/518,768

(22) Filed: Mar. 3, 2000

Related U.S. Application Data

(60) Provisional application No. 60/131,995, filed on Apr. 29, 1999.

(51) Int. Cl.[7] .......... B65G 51/24

(52) U.S. Cl. .......... 406/182; 406/85; 406/107

(58) Field of Search .......... 406/52, 85, 107, 406/181, 182; 137/595, 625.46

(56) References Cited

U.S. PATENT DOCUMENTS

| | | | | |
|---|---|---|---|---|
| 3,494,175 | * | 2/1970 | Cusick et al. | 73/37 |
| 3,747,630 | * | 7/1973 | Hurrell | 137/312 |
| 3,837,360 | * | 9/1974 | Bubula | 137/625.46 |
| 4,911,340 | * | 3/1990 | Abom | 406/52 |
| 5,182,430 | | 1/1993 | Lagain . | |
| 5,207,643 | * | 5/1993 | Davis | 137/625.46 |
| 5,277,144 | * | 1/1994 | Moody | 137/625.46 |
| 5,601,115 | | 2/1997 | Broerman . | |
| 5,992,453 | | 11/1999 | Zimmer . | |
| 5,993,554 | | 11/1999 | Keicher et al. . | |

* cited by examiner

*Primary Examiner*—Joseph E. Valenza
*Assistant Examiner*—Joe Dillon, Jr.
(74) *Attorney, Agent, or Firm*—John P. O'Banion

(57) ABSTRACT

A device for increasing the uniformity of solids within a solids fabrication system, such as a direct light fabrication (DLF) system in which gas entrained powders are passed through the focal point of a moving high-power light which fuses the particles in the powder to a surface being built up in layers. The invention provides a feed through interface wherein gas entrained powders input from stationary input lines are coupled to a rotating head of the fabrication system. The invention eliminates the need to provide additional slack in the feed lines to accommodate head rotation, and therefore reduces feed line bending movements which induce non-uniform feeding of gas entrained powder to a rotating head.

21 Claims, 5 Drawing Sheets

FIG. 4
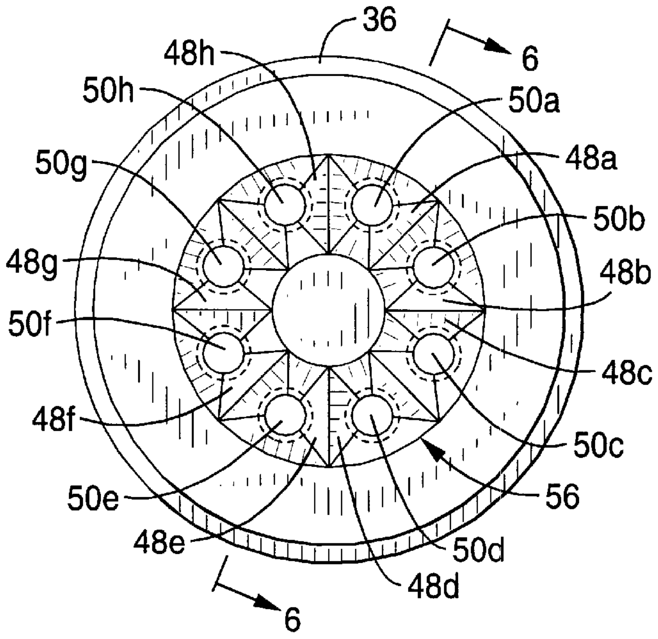
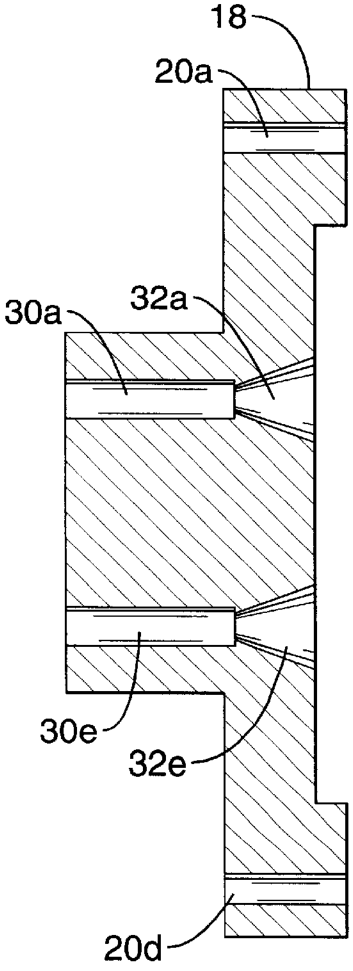
FIG. 5
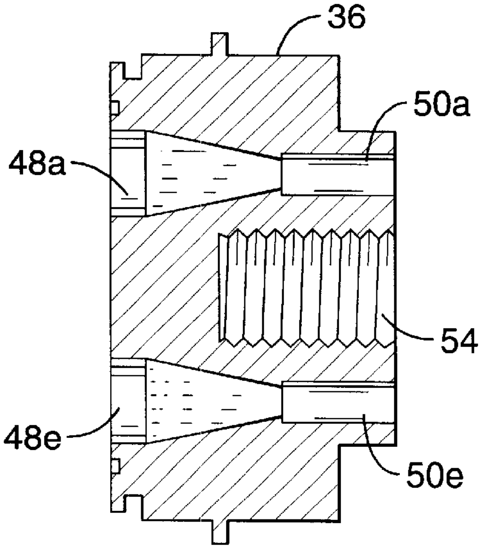
FIG. 6

ROTARY POWDER FEED THROUGH APPARATUS

CROSS-REFERENCE TO RELATED APPLICATIONS

This application claims priority from U.S. provisional application Ser. No. 60/131,995 filed on Apr. 29, 1999.

STATEMENT REGARDING FEDERALLY SPONSORED RESEARCH OR DEVELOPMENT

This invention was made with Government support under Contact No. W-7405-ENG-36, awarded by the Department of Energy. The Government has certain rights in this invention.

REFERENCE TO A MICROFICHE APPENDIX

Not Applicable.

BACKGROUND OF THE INVENTION

1. Field of the Invention

This invention pertains generally to solids fabrication processes, and more particularly to a feedthrough device for distributing gas entrained materials to a rotating head assembly, such as found within a solids fabrication system.

2. Description of the Background Art

Fabrication of three-dimensional solids is being performed within fabrication systems that build up a solid by layered fusing bits of material carried in a gas. One such system is a directed light fabrication (DLF) system. In a DLF system powders are injected into a moving beam of high power light, generally a laser light beam. The powders are typically metallic particles, however plastics and other fusible materials can be used. The powders are carried by a stream of gas, commonly argon, to the focal point of the laser beam wherein fusing of the material to the previous layer of material occurs. The gas provides a non-reactive carrier for the particles of the powder which are to be fused into a solid. In practice, the powder often gets injected non-uniformly about the beam resulting in a build-up of the fused powder material that is also of non-uniform structure. The flow of powder in the input feed lines may be adjusted to suit conditions required at the head, yet non-uniform injection may still occur. One contributing factor to the non-uniform injection of powders arises when the laser head and nozzles within a DLF system rotate. Conventionally, in order to accommodate head rotation, the input lines have been provided with an amount of slack in them. During rotational movements, the input lines are thereby subjected to a variety of movements which alter the distribution of gas entrained powder flow being emitted at the nozzles.

To achieve a uniform finished structure, therefore, it is important to reduce the disruptive gyrations of powder feed lines whereby increased uniformity of powder injection may occur. The rotary powder feed through apparatus in accordance with the present invention provides a coupling which satisfies the need to minimize feed line movements to the head, and overcomes additional deficiencies in current techniques for the coupling of gas entrained powder to a rotating head assembly.

BRIEF SUMMARY OF THE INVENTION

The present invention provides a feed through coupling between a stationary set of input lines and a set of output lines which are rotating with the head within a solids fabrication system, such as a directed light fabrication (DLF) system. The feed through system thereby eliminates the need for slack supply lines, and the motions thereof, to accommodate the rotation. The gas entrained powder feed through of the invention can employ input and output lines that remain relatively fixed, the lines do not gyrate and flop about in response to head rotations, as they do not contain the slack in the tubing (hoses) which was required previously. Eliminating the gyrations of the feed tubes by the inventive system provides for improvement in the uniformity of the powder flow rate.

An object of the invention is to provide a rotational interface between a set of fixed input lines and a rotating nozzle head being fed with gas entrained powder.

Another object of the invention is to maintain even distribution of gas entrained powder through the rotary powder feed through.

Another object of the invention is to minimize flow restriction introduced by the rotary powder feed through according to the invention.

Another object of the invention is to provide a feed through mechanism that can be implemented to accommodate various numbers of feed lines.

Another object of the invention is to provide for free rotational movement of the fabrication head without interference from the interactions between feed lines.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 4 is a plan view of the interior of the rotating base member shown in FIG. 3.

FIG. 5 is a cross section view of the stationary base member shown in FIG. 2 taking though line 5—5.

FIG. 6 is a cross section view of the rotating base member shown in FIG. 3 taken through line 6—6.

DETAILED DESCRIPTION OF THE INVENTION

Referring more specifically to the drawings for illustrative purposes, the present invention is embodied in the apparatus generally shown in FIG. 1 through FIG. 10. It will be appreciated that the apparatus may vary as to configuration and as to details of the parts, and that the method may vary as to the specific steps and sequence, without departing from the basic concepts as disclosed herein.

Figure 1:
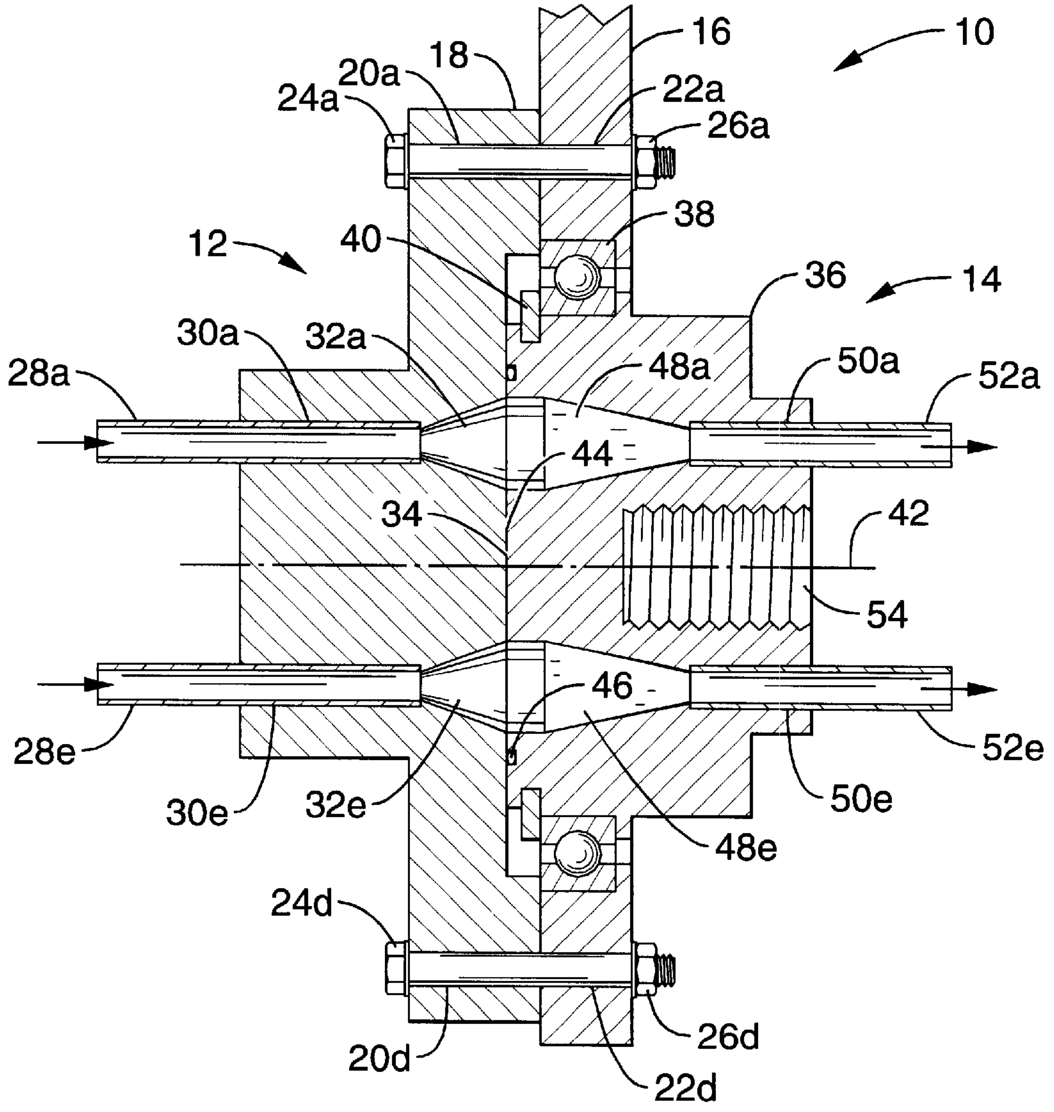
FIG. 1 is a cross section of an eight line rotary powder feed through apparatus according to the invention.
Figure 2:
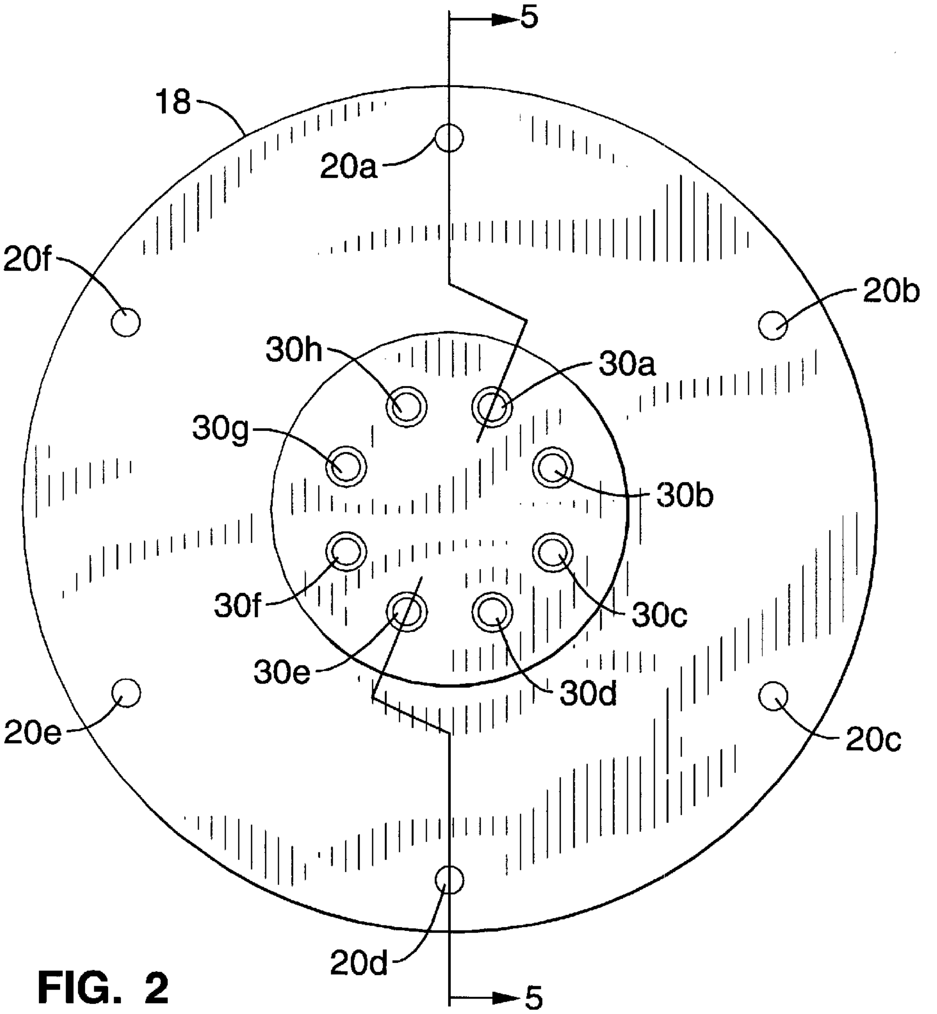
FIG. 2 is a plan view of the stationary base member portion of the apparatus shown in FIG. 1.

Referring first to FIG. 1, a rotary powder feed through apparatus 10 according to the invention is shown in cross section. The rotary powder feed through apparatus generally comprises an input member and an output member. In the embodiment of rotary powder feed through 10 shown, the input member is provided by a stationary plate assembly 12, while the output member is provided by a rotatable disk assembly 14. The stationary plate assembly 12 is retained in position by a mounting bracket 16. The stationary plate assembly 12 comprises a stationary base member 18 which is attached to the mounting bracket 16. The stationary base member 18 is configured with six mounting holes 20*a–f* which line up with corresponding mounting holes 22*a*–f on the mounting bracket 16 through which bolts 24*a–f* are inserted and retained by nuts 26*a*–f. Referring also to FIG. 2, the six mounting holes 20*a–f* on the stationary base member 18 can be seen along with an array of eight input connection cavities 30*a–h.* The stationary base member 18 can be seen as a cutaway view in FIG. 5 wherein a single pair of fluid communication channels can be seen. The input connection cavities 30*a,* 30*e* preferably lead into conical, "V-shaped", input chambers 32*a,* 32*e,* respectively.

Referring again to FIG. 1, a circular array of eight input feed tubes 28*a–h* are shown for receiving gas entrained powder. The input feed tubes 28*a–h* are insertably held within input connection cavities 30*a–h,* the friction fit within the cavity may be augmented with adhesives or any of various retention fasteners. Alternatively, connectors (not shown) may be used to attach the tubes to the input connection cavities 30*a–h.* The input connection cavities 30*a–h* open up into input chambers 32*a–h* within the stationary base member 18 and terminate at a planar face 34.

Figure 3:
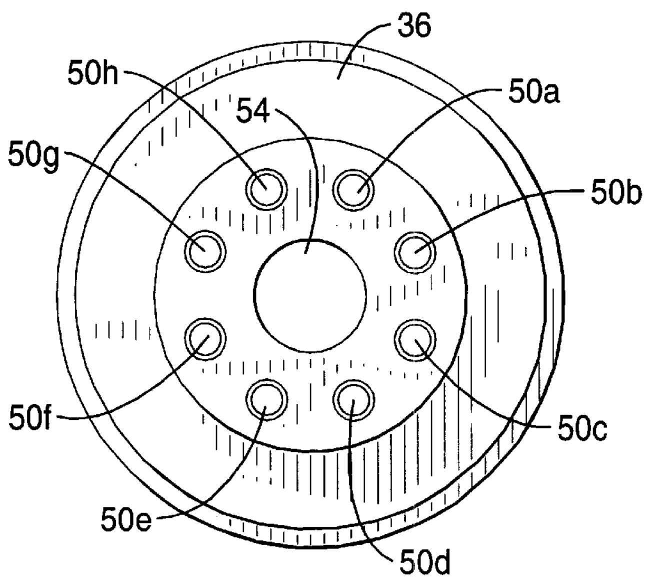
FIG. 3 is a plan view of the rotating base member portion of the apparatus shown in FIG. 1.
Figure 7:
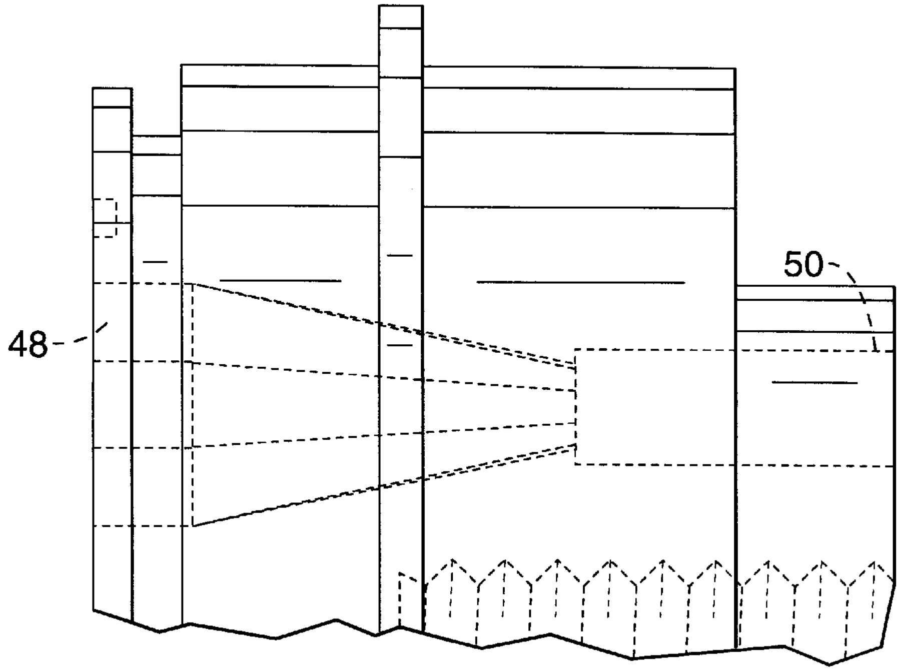
FIG. 7 is a side view of an aperture chamber shape employed within the rotatable base member.

Retained in proximal contact with the stationary plate assembly 12 is a rotatable disk assembly 14 which rotates within a bearing 38 held annularly disposed by retainer 40 peripherally about a rotatable base member 36 with axis of rotation 42. Planar face 44 is thereby retained in proximal surface contact with planar face 34 of the stationary plate assembly 12. Referring also to FIG. 3, the output side of the rotatable base member 36 is shown with output connections 50*a–h* around a threaded cavity 54.

The opposing planar faces in FIG. 1. are shown are sealed to one another by seal 46 to prevent excess leakage of gas. It will be appreciated that seal 46 may comprise an o-ring or other sealing mechanism. The embodiment is shown with the rotatable disk assembly 14 retaining bearing 38 in a surrounding recess by means of a retainer 40. The bearing 38 containing the rotatable disk assembly 14 is held in place between the stationary base member 18 and the mounting bracket 16. Alternatively the bearing may be used to attach the rotatable disk assembly 14 to the stationary plate assembly 12, wherein the combination is then attached to a mounting bracket, or other member, for positioning the rotary powder feed-through.

Figure 8:
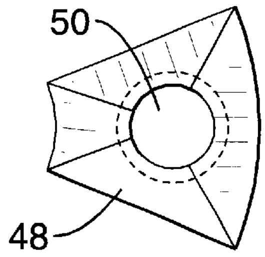
FIG. 8 is an end view of the aperture chamber shape of FIG. 7.
Figure 9:
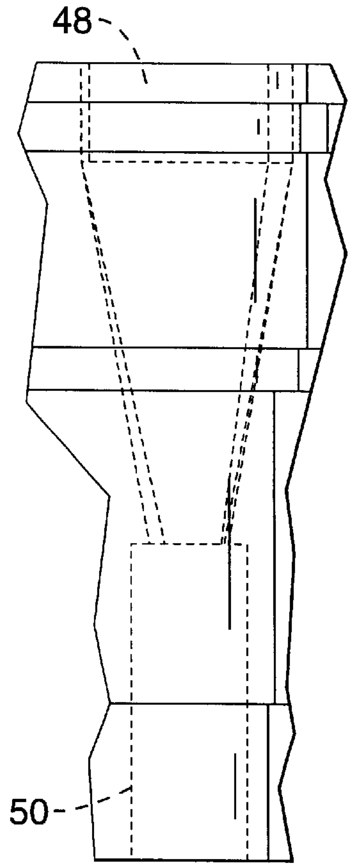
FIG. 9 is a top view of the aperture chamber shape of FIG. 7.

Referring also to FIG. 4, eight output chambers 48*a–h* are disposed on the planar face 44 of the rotatable base member 36 to collect gas entrained powder for the output connection cavities 50*a–h.* Chambers 48*a–h* are shown as adjacent arcuate sections on the planar face 44, the collection of arcuate sections forming a ring 56 which align with the outputs from the stationary base member for collecting the gas entrained material passing therethrough. The corners of the pyramids forming the chambers 48*a–h* are shown extending inwardly as they narrow down toward the output connection cavities 50*a–h.* FIG. 6 shows a cross-section of the rotational base member 36 with chambers 48*a,* 48*e,* and output connection cavities 50*a,* 50*e.* The shape of a chamber 48 is shown in detail in FIG. 7 as hidden lines connecting with the connection cavity 50. A detailed view looking into a chamber 48 is shown in FIG. 8. A chamber 48 is shown in FIG. 9 as viewed from the axis of rotation 42 of FIG. 1.

Referring again to FIG. 1, output feed tubes 52*a–h* are retained within the connection cavities 50*a–h* to carry gas entrained powder to the nozzle head. A recessed threaded cavity 54 allows the connection of a rotational driving mechanism along with additional equipment in-line with the rotational axis of the rotary powder feed through.

In use, the gas entrained powder enters the array of input feed tubes 28*a–h* into the connection cavities 30*a–h* and expands in the conical chambers 32*a–h.* Each gas entrained powder stream flowing from an input chamber is collected by one or more output chambers 48*a–h.* Therefore, it will be appreciated that an input connection may be in fluid communication with any output connection as determined by the extent of rotation between the input and output members. The output chambers are preferably aligned adjacent to one another such that only a narrow planar divider separates each chamber at the planar face 44 of the rotatable base member 36; therefore the gas from the inputs are generally commutated across a pair of output chambers under angular movement of the rotatable disk assembly 14. It will be appreciated that this configuration of adjacent output chambers separated by a narrow planar divider provides for gas intrained powder collection that induces relatively constant backpressure in view of the minimal flow resistance offered at the planar interface between the input and output chambers. If other chamber configurations or shapes are used, the width of the divider between the could be measured in degrees of arc, and preferably less than one or two degrees. For example, if the arc were as much as five degrees, then for an eight output rotary powder feed through, a forty degree portion (e.g., 10% or more depending on chamber shape) of the rotatable disk portion might be unable to communicate the gas intrained powder from the stationary base member. Therefore with the input chamber described, a separation arc exceeding about five degrees is expected to create fluctuations, in material flow since over a tenth of the area of the chambered ring would be unable to communicate gas entrained powder.

The output chambers 48*a–h* are held in closely spaced proximity with the input chambers for communicating gas entrained powder, which can best be seen in FIG. 4. When the disk assembly 14 is rotating, each input connector is put into fluid communication with one, or more often two, output connectors. The splitting of the flow of gas entrained powder across multiple chambers reduces the specific flow distribution of the input lines by averaging each across two adjacent chambers. If the chambers are alternatively configured to partially overlap one another, leaving no complete dividing space between chambers, the resultant leakage between chambers can have the undesired effect of completely changing the flow distribution from the inputs to the head.

Figure 10:
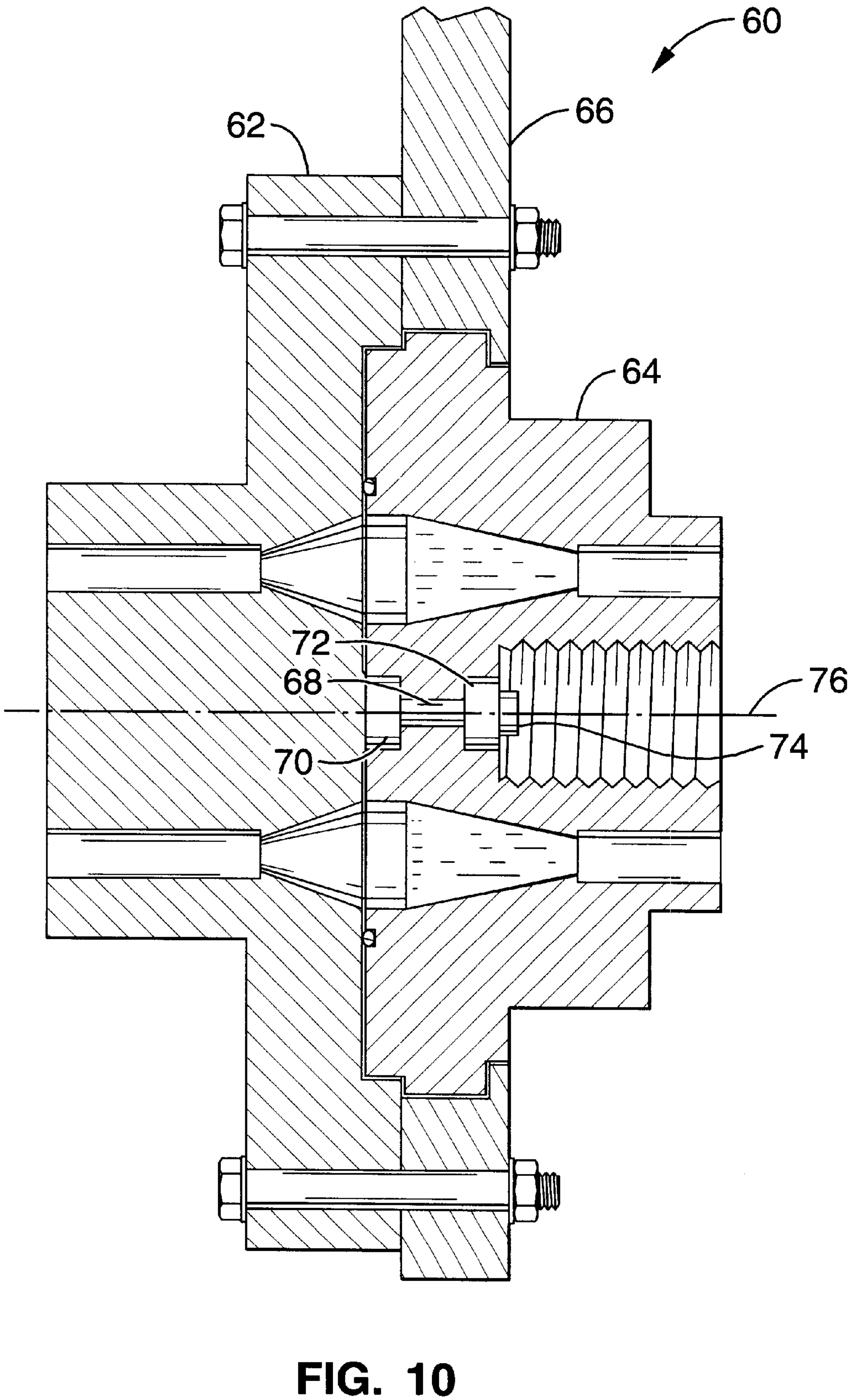
FIG. 10 is a cross section of an alternate embodiment of the rotary powder feed apparatus according to the invention.

FIG. 10 shows a rotary powder feed through apparatus 60 that employs a different rotational mechanism. A stationary base member 62 is attached to a rotational base member 64, and the assembly is in turn attached to a mounting bracket 66. The input and output connection arrangement is the same as used for FIG. 1. However, within this embodiment, a shaft 68 is used in conjunction with a lower bearing 70 and an upper bearing 72 and retained to the shaft with a retainer 74. As can be seen, the axial arrangement of this embodiment is similar to the manner of retaining the front wheels on many automobiles. In large DLF systems, which could employ large feed lines, this embodiment can eliminate the need for large diameter bearings.

The described embodiment is preferably machined from a metal material whose wear resistance to the flow of the gas entrained particulates provides sufficient longevity. Elements of the invention may be materially hardened, or be provided with inserted materials to augment the hardness and thereby further increase longevity of the feedthrough device.

It will be appreciated that variations of the described embodiments may be implemented by anyone with ordinary skill in the art. For example, the number and arrangement of the input feed lines can be changed, and even multiple circular arrays of connectors can be supported. Two methods of attaching the rotatable disk assembly to the stationary plate assembly have been shown, whereas a number of alternative connection methods can be configured by one of ordinary skill in the art. A preferred shape for the input and output chambers has been shown, however these chambers can be shaped in a variety of forms. As can be seen, the output chambers are preferably shaped to collect the gas entrained particles over a large area to provide for a constant backpressure. It should be apparent to one of ordinary skill in the art, however, if the input nozzles were configured to uniformly spread the particles over a wide area, then large input chambers could be used with a smaller area of output chambers to collect the gas entrained particles.

It should be recognized that the inventive principles are generally applicable to other situations that require material feedthrough while maintaining somewhat fixed levels of flow distribution in lines. Furthermore for applications in which a rotating set of input lines is to be coupled to a fixed set of output lines, the roles of stationary and rotating can be reversed wherein the input member would rotate and the output member would remain stationary.

Accordingly, it will be seen that the invention of a rotary powder feed through provides a simple and rugged device for providing uniform flow of gas entrained powder to a rotating head that eliminates the numerous drawbacks associated with the use of long feed tubes wherein the slack of the tubes is used to compensate for the rotation of the head.

Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. An apparatus which distributes gas entrained material from a stationary sosurce of gas entrained material to a head assembly while said head assembly is subject to rotation, comprising:

(a) an input member having a plurality of input connections configured for receiving gas entrained material;

(b) an output member rotatably coupled to said input member, said output member having a plurality of output connections that are configured to provide continuous fluid communication with said input connections despite changes in the angular position of the rotatable output member.

2. An apparatus as recited in claim 1, further comprising a seal between said input member and said output member which prevents the loss of gas entrained material.

3. An apparatus as recited in claim 1, wherein the output connections of the output member are further adapted with tapered collection chambers, facing said input member, for reducing the flow restriction, and variation thereof, as the angular position of the rotatable coupling changes.

4. An apparatus as recited in claim 1, wherein the input connections of the input member are further adapted with dispersion chambers facing said output member that are configured for dispersing the gas entrained material to reduce flow restriction, and variation thereof, as the angular position of the rotatable output member changes.

5. An apparatus which distributes gas entrained material to a rotating assembly, comprising:

(a) an input member having at least one circular array of input connections on a first side that are configured for receiving gas entrained material and fluidly coupling said gas entrained material to apertures on a second side of said input member; and (b) an output member rotatably coupled to the input member, said output member having a circular array of apertures on a first side that are configured to receive, independent of relative angular position, a flow of gas entrained material which exits said second side of said input member, wherein the flow of gas entrained material is routed through at least one circular array of output connections on said output member toward the rotating assembly.

6. An apparatus as recited in claim 5, further comprising at least one seal between the input member and the output member, said seal configured to contain the gas entrained material within the combination of said input member and said output member.

7. An apparatus as recited in claim 5, wherein each input connection is capable of being coupled to an input line for the receipt of gas entrained material, and wherein each output connection on the output member is capable of being coupled to an output line for the distribution of gas entrained material, and wherein each input connection is configured to provide disbursement of gas entrained material to each of the output lines as collected within the rotating output member which is maintained in constant fluidic communication with the input member, the gas entrained material being thereafter communicated to the output lines.

8. An apparatus as recited in claim 5, further comprising a circular bearing ring positioned between said input member and said output member, said bearing ring surrounding the circular array of output connections, to support rotation between said input member and said output member.

9. An apparatus as recited in claim 5, wherein each aperture on the second side of said input member is adapted as a chamber configured for dispersing the gas entrained material as it exits said input member to enhance the unrestricted flow of gas entrained material which is distributed from the input member to the output member.

10. An apparatus as recited in claim 5, wherein the input member is stationary and the output member rotates in response to rotation of the rotating assembly.

11. An apparatus as recited in claim 5, wherein the apertures on the first side of said output member comprise tapering chambers configured for collecting gas entrained material as it exits the input member regardless of the relative angular displacement of the output member in relation to the input member.

12. An apparatus as recited in claim 11, wherein said tapering chambers on the first side of said output member are arranged substantially adjacent one another to provide for unrestricted flow of gas entrained material which is distributed from the input member to the output member.

13. An apparatus as recited in claim 5, further comprising an axial pivot between the input member and the output member to support rotation between said input member and said output member.

14. An apparatus as recited in claim 13, wherein said axial pivot comprises a bearing surface annularly disposed on an axle.

15. An apparatus which delivers gas entrained material to a rotating head assembly, comprising:

(a) an input member having a first portion with a plurality of input connections that are configured for delivering gas entrained material to a plurality of outputs on a second portion of said input member; and (b) an output member rotatably coupled to the input member, said output member including a plurality of collection chambers on a first portion that fluidly connect to output connections on a second portion which are configured for communicating gas entrained material to a rotating head assembly, each of said collection chambers capable of being positioned to receive gas entrained material from any of said outputs on said input member in response to angular displacement of the rotatable coupling, such that gas entrained material entering the input connections of the input member are distributed to the output connections of the output member.

16. An apparatus as recited in claim 15, wherein the rotatable coupling is configured as an annular coupling comprising a circular bearing ring encircling the fluidic connections for the gas entrained material and positioned between said input member and said output member.

17. An apparatus as recited in claim 15, wherein the rotatable coupling is configured as an axial coupling comprising a bearing surface annularly disposed on an axle.

18. An apparatus as recited in claim 15, further comprising at least one seal between the input member and the output member, said seal configured to prevent the escape of gas entrained material between said input member and said output member.

19. An apparatus as recited in claim 15, wherein said outputs on said second portion of said input member and the collection chambers of said output member are arranged substantially in complementary ring configurations such that each output of said input member can be aligned with a corresponding collection chamber on the output member to provide for continuous fluid communication between said input connections of the input member and said output connections of said output member.

20. An apparatus as recited in claim 19, wherein said collection chambers are arranged within said ring configuration such that less than approximately five degrees of arc exists between the perimeters of adjacent collection chambers, as measured from the center of rotation of the output member, the narrow spacing of adjacent collection chambers resulting in a reduction of backpressure-induced fluctuatuons in the distribution of gas entrained material.

21. A method of communicating gas entrained powder from a stationary set of feed lines to a rotating head, comprising the steps of:

(a) receiving gas entrained powder within a plurality of input lines on a circular array of input connections on a first member;

(b) distributing the gas entrained powder from said circular array of input connections on said first member to circular array of output connections on a second member positioned proximal to, and in relative rotation with, said first member, wherein during rotation the gas entrained material is distributed as the fluidic communication between the input member and output member is maintained even though the association between input connections and output connections changes; and (c) conveying gas entrained powder from said output connections of said second member to rotating head.

* * * * *